United States Patent
Bronicki

(10) Patent No.: US 9,403,694 B2
(45) Date of Patent: Aug. 2, 2016

(54) SYSTEM FOR PROCESSING BRINES

(71) Applicant: ORMAT TECHNOLOGIES, INC., Reno, NV (US)

(72) Inventor: Lucien Y. Bronicki, Yavne (IL)

(73) Assignee: ORMAT TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/411,734

(22) PCT Filed: Mar. 13, 2014

(86) PCT No.: PCT/IB2014/000334
§ 371 (c)(1),
(2) Date: Dec. 29, 2014

(87) PCT Pub. No.: WO2014/140756
PCT Pub. Date: Sep. 18, 2014

(65) Prior Publication Data
US 2015/0284262 A1    Oct. 8, 2015

Related U.S. Application Data

(60) Provisional application No. 61/791,441, filed on Mar. 15, 2013.

(51) Int. Cl.
| | | |
|---|---|---|
| C02F 1/04 | (2006.01) | |
| C02F 1/16 | (2006.01) | |
| F03G 7/04 | (2006.01) | |
| F28F 19/00 | (2006.01) | |
| F24J 3/08 | (2006.01) | |
| C02F 103/02 | (2006.01) | |

(Continued)

(52) U.S. Cl.
CPC . *C02F 1/16* (2013.01); *C02F 1/042* (2013.01); *F03G 7/04* (2013.01); *F24J 3/08* (2013.01); *F28F 19/00* (2013.01); *C02F 2103/023* (2013.01); *C02F 2103/06* (2013.01); *C02F 2103/08* (2013.01); *C02F 2303/22* (2013.01); *Y02E 10/10* (2013.01)

(58) Field of Classification Search
CPC ........ C02F 1/042; C02F 1/16; C02F 2103/08; C02F 2103/023; C02F 2103/06; C02F 2103/22; Y02E 10/10; Y02E 10/18; F03G 7/04; F24J 31/08; F24J 3/08
See application file for complete search history.

(56) References Cited

U.S. PATENT DOCUMENTS

| | | | | |
|---|---|---|---|---|
| 4,057,964 A | * | 11/1977 | Hutchinson | ............... F03G 7/04 165/45 |
| 4,132,075 A | * | 1/1979 | Fleck | .................... F01K 21/005 203/11 |

(Continued)

OTHER PUBLICATIONS

International Search Report issued Nov. 19, 2014 in PCT/IB14/00334.

*Primary Examiner* — Renee E Robinson
*Assistant Examiner* — Jonathan Miller
(74) *Attorney, Agent, or Firm* — Oblon, McClelland, Maier & Neustadt, LLP

(57) ABSTRACT

The present invention provides a geothermal based heat utilization system for just about preventing scaling of geothermal fluid in a heat exchanger, comprising a mixing unit upstream to a heat exchanger of said system and in which separated brine, steam condensate and non-condensable gas portions are mixed so as to just about reconstruct the geothermal fluid to just about equilibrium conditions such that dissolved solids are assured not to precipitate in the heat exchanger.

2 Claims, 2 Drawing Sheets

(51) Int. Cl.
*C02F 103/06* (2006.01)
*C02F 103/08* (2006.01)

(56) References Cited

U.S. PATENT DOCUMENTS

| | | | |
|---|---|---|---|
| 5,038,567 A * | 8/1991 | Mortiz | F03G 7/04 60/641.5 |
| 5,671,601 A | 9/1997 | Bronicki et al. | |
| 5,816,048 A | 10/1998 | Bronicki et al. | |
| 7,775,045 B2 * | 8/2010 | Kaplan | F01K 23/02 60/641.2 |
| 8,193,659 B2 | 6/2012 | Bronicki et al. | |
| 8,276,381 B2 | 10/2012 | Weres | |
| 2011/0219769 A1 * | 9/2011 | Weres | B01D 19/0036 60/641.5 |

* cited by examiner

FIG.1 TWO PHASE ORC

SYSTEM FOR PROCESSING BRINES

FIELD

The present invention relates to the field of power generation by means of a geothermal fluid. More particularly, the invention relates to a system and method for preventing scaling of the geothermal fluid.

BACKGROUND

Geothermal fluid exiting production wells is separated into a steam portion and a brine portion at many prior art geothermal based power plants. The steam portion is expandable in a steam turbine to produce power and electricity, and the heat content of the brine portion may be exploited by being brought in heat exchanger relation with the motive fluid of a binary power cycle, e.g. organic motive fluid, to preheat the motive fluid. To increase productivity of the geothermal resource and maintain environmentally safe conditions, steam condensate, spent brine, and non-condensable gases are generally returned to the resource via a reinjection well.

A significant problem associated with the generation of power by means of geothermal fluid is one of clogging and scaling of heat exchangers, which serve to transfer heat from the brine to the organic fluid, by solids precipitated out of the brine.

In many geothermal resources, the geothermal fluid contains dissolved solids, e.g. silica and calcite, and gases, e.g. carbon dioxide and hydrogen sulfide, in equilibrium at the prevailing subterranean temperature and pressure. However when production wells are drilled in order to exploit these resources, the hydrostatic pressure of the geothermal fluid is reduced at a reduced depth, resulting in the flashing of the steam and the liberation of dissolved gases. The brine consequently becomes more concentrated due to steam flashing and degassing, usually exceeding the saturation levels of scale-forming materials in the brine. It has also been discovered that the rate of precipitation increases as the pH level of the brine increases. The brine generally tends to remain supersaturated such that precipitation of the dissolved solids occurs gradually along the brine flowpath, including precipitation of carbonates at or upstream to the well head and at the inner walls of heat exchanger tubing and slower silicon precipitation on the casing of the injection well. This scaling effect reduces power plant output due to reduced heat flux and fluid flow through the heat exchanger tubing, and due to power plant shutdowns in order to perform maintenance operations.

One prior art method for preventing scaling of the geothermal fluid involves pressurizing the brine above the steam flashing and gas liberation pressure by means of a pump positioned deeply within the production well. This method is suitable for low enthalpy geothermal fluids having small amounts of dissolved solids and gases at moderate temperature equilibrium conditions.

When the brine composition and temperature is not suitable for being pressurized by a pump positioned deeply within the production well, for example when the geothermal resource contains a high enthalpy geothermal fluid, another prior art scaling preventing method is related to chemical based scaling inhibition whereby caustic soda or other pH raising chemicals are added to the geothermal fluid by a process which is not cost effective, to control the corrosion rate of the brine-disposal piping and of the reinjection well casing while avoiding excessive scaling. If silica is present in the geothermal fluid, acid is injected in order to reduce pH and to prevent scaling.

Another prior art scaling preventing method concerns the combining of steam condensate and acidic brine. As the steam condensate is less acidic than the brine, the brine becomes diluted, and the degree of scaling is reduced.

In U.S. Pat. No. 5,497,624, brine exiting the preheater is combined with steam condensate and with compressed non-condensable gases to bring about a reduction in the amount of mineral precipitation in the conduits leading to the reinjection well, as well as in the injection well itself.

In U.S. Pat. No. 5,816,048, steam condensate exiting a vaporizer for vaporizing organic motive fluid is mixed with acidic brine exiting a separator, such that the combined stream is introduced to a preheater for increasing the sensible heat of the motive fluid. In one embodiment, the steam condensate is added to the acidic brine before it is applied to a second vaporizer. The non-condensable gases are then compressed and introduced into cooled and diluted brine, and the resulting effluent is injected into the reinjection well.

Despite being diluted, the brine remains somewhat acidic and mineral precipitation continues to be noticeable, although to a smaller extent. The conduits and heat exchangers in contact with the brine have to made resistant to the corrosive effects of the brine, further adding costs to the power plant.

It is an object of the present invention to provide a method for considerably reducing, or completely preventing, the amount of mineral precipitation on power plant equipment and conduits relative to prior art scaling preventing methods when geothermal brine is used to transfer heat to a motive fluid of a binary power cycle.

It is an additional object of the present invention to maximize utilization of heat contained in the brine for power production even though scaling is prevented.

It is an additional object of the present invention to prevent scaling from geothermal fluid without use of, or with very little use of, chemical inhibitors.

Other objects and advantages of the invention will become apparent as the description proceeds.

SUMMARY

The present invention provides a geothermal based heat utilization system for just about preventing scaling of geothermal fluid in a heat exchanger, comprising a mixing unit upstream to a heat exchanger of said system and in which separated brine, steam condensate and non-condensable gas portions are mixed so as to just about reconstruct the geothermal fluid to just about equilibrium conditions such that dissolved solids are assured not to precipitate in the heat exchanger.

DETAILED DESCRIPTION

The present invention comprises a system and method for preventing scaling of geothermal fluid in power plant equipment by reconstructing the geothermal fluid, after having been separated in order to produce power by means of the separated geothermal steam, to equilibrium conditions at which dissolved solids will not precipitate. The heat content of the reconstructed geothermal fluid is utilized to further increase the amount of power that can be produced from the geothermal power plant. The geothermal fluid is reconstructed upstream to one or more heat exchangers for transferring heat to the motive fluid of the binary power plant, so that the heat exchangers will be just about maintenance free due to the improved mitigation or reduced scaling.

The composition and subterranean equilibrium conditions of the geothermal resource, particularly but not limited to a combination of temperature and pressure, are determined prior to operating the power plant, for example by means of a subterranean probe, allowing the material behavior of the components of the geothermal resource to be known. Once the power plant is in operation, the reconstruction of the geothermal fluid is optimized so as to achieve equilibrium conditions, at which solid particles are retained in solution without precipitation, by utilizing knowledge of the geothermal resource's material behavior.

Figure 1:
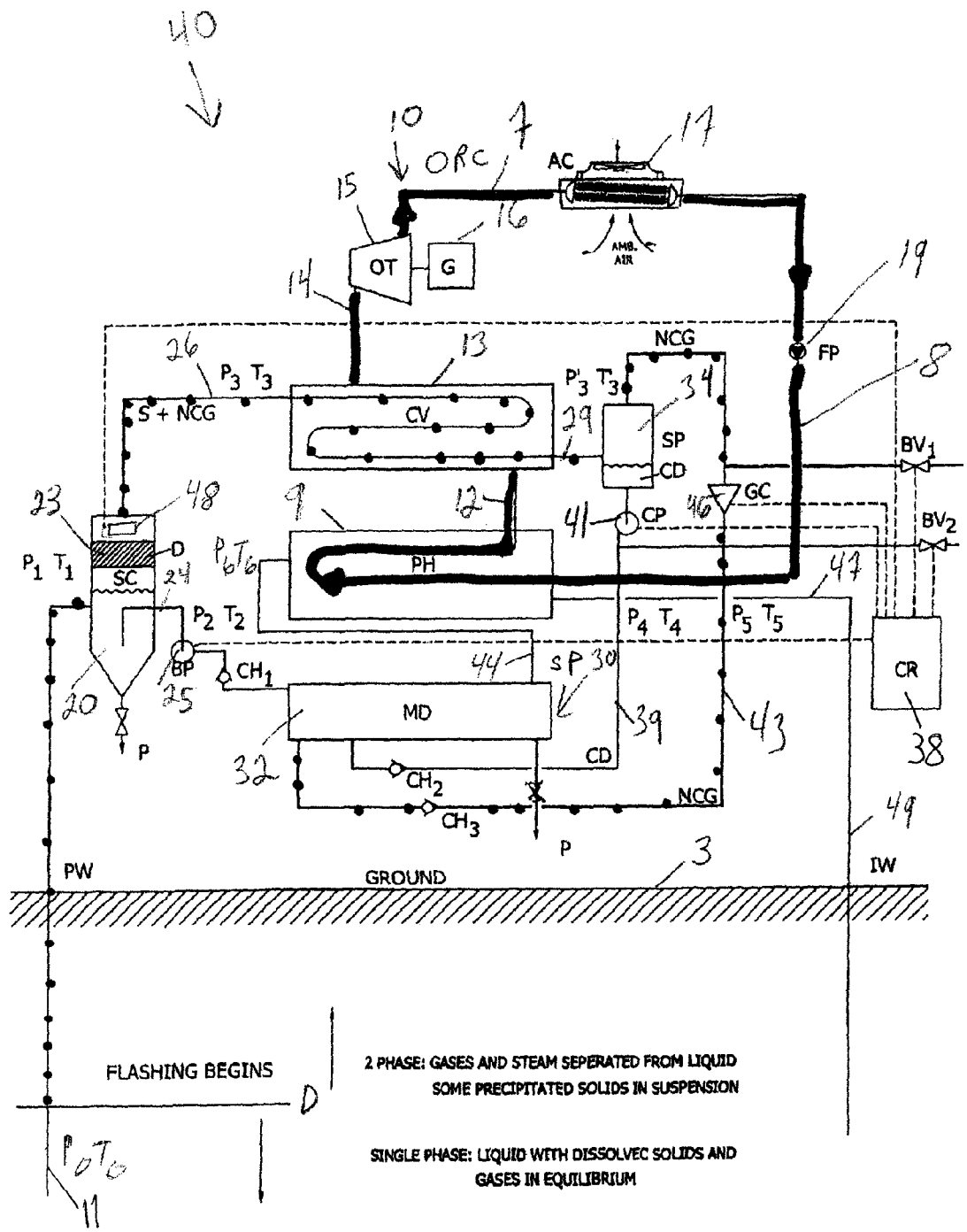
FIGS. 1-2 are two embodiments, respectively, of a geothermal based heat utilization system.

FIG. 1 illustrates a geothermal based, binary cycle power plant according to one embodiment of the present invention, and is designated by reference numeral 40. Power plant 40 comprises an Organic Rankine Cycle (ORC) type power system 10, a separator/cyclone (SC) 20 for separating geothermal fluid into a steam portion and a brine portion that are operable in conjunction with ORC system 10, and scaling preventing (SP) system 30. SP system 30 comprises mixing unit 32, controller 38, and various flow control devices, in order to control the manner by which the brine is reconstructed. The thick solid lines indicate conduits through which organic fluid flows. The dotted lines indicate conduits through which gaseous or vapor fluid flows, and the thin solid lines indicate conduits through which liquid flows. The dashed lines indicate communication paths along which a control signal is transmitted.

The geothermal resource extractable through production well (PW) 11 is generally of a single liquid phase at the prevailing underground conditions $P_0T_0$ such that the brine in which solid particles are dissolved is in equilibrium with vapor and gases. A water portion of the geothermal resource totally or partially flashes as the geothermal resource rises within PW 11 to a predetermined depth D below ground level 3, due to the reduced hydrostatic pressure of the resource. The geothermal resource accordingly flows upwardly to SC 20 in a two-phase flow, whereby non-condensable gases (NCGs) and steam flow together with liquid brine while some solids precipitate, although they generally remain in suspension.

The geothermal fluid, is introduced into SC 20 at a pressure $P_1$ and a temperature $T_1$ less than subterranean equilibrium conditions $P_0T_0$. SC 20 may be a gravity based vapor-liquid separator, or may be a cyclone that separates the liquid brine by centrifugal motion. To further aid the separation process, a demister 23 may be employed to remove liquid droplets that are suspended in a stream of steam or NCGs.

A combined stream of single vapor or gas phase fluid at $P_3T_3$ including steam and NCGs exits SC 20 from an upper port thereof, and flows to condenser/vaporizer (CV) 13 via conduit 26, in order to vaporize the organic motive fluid of ORC 10. The vaporized organic fluid is delivered via conduit 14 to organic vapor turbine 15, and is expanded thereby to produce power and to produce electricity by means of electric generator 16 coupled thereto. The turbine discharge flows to air-cooled condenser 17, or alternatively to a water cooled condenser, via conduit 7. The organic motive fluid condensate discharged from condenser 17 is pressurized by feed pump 19, and is delivered to preheater 9 via conduit 8. The preheated organic condensate flows through conduit 12 to CV 13.

The capacity of preheater 9 and CV 13 is generally dependent upon the well head pressure of production well 11, as well upon the location of the geothermal production pump and the hydraulic head thereabove. Once the well head pressure is established, the flow rate of the geothermal fluid is also set, thereby influencing the heat content present in the geothermic fluid and consequently the heat surface area of preheater 9 and CV 13. Preheater 9 and CV 13 may be shell and tube heat exchangers.

The separated liquid brine exits SC 20 at thermodynamic conditions of $P_2T_2$ from a lower port thereof via conduit 24, and is delivered to mixing unit 32 by means of brine pump 25. Any solid matter P that was entrained by the extracted geothermal fluid or precipitated within SC 20 falls through the funnel shaped bottom portion thereof and is discharged from a port at the lowermost region of SC 20.

The heat depleted combined stream of steam and NCGs exits CV 13 at thermodynamic conditions of $P'_3T'_3$ less than $P_3T_3$ and flows via conduit 29 to secondary separator 34, which is adapted to separate NCGs from steam condensate. The steam condensate is delivered to mixing unit 32 via conduit 39 by means of condensate pump 41 at thermodynamic conditions of $P_4T_4$. The NCGs are delivered to mixing unit 32 via conduit 43 by means of compressor 46 at thermodynamic conditions of $P_5T_5$. Check valves $CH_{1-3}$ are operatively connected to conduits 24, 39 and 43, respectively, to prevent backflow.

In mixing unit 32, brine at conditions $P_2T_2$, steam condensate at conditions $P_4T_4$ and NCGs at conditions $P_5T_5$ are mixed together to produce reconstructed geothermal fluid at solubility equilibrium conditions $P_6T_6$ that is designed to prevent or reduce precipitation. The reconstructed fluid which flows through conduit 44 from mixing unit 32 to preheater 9 has a sufficiently high heat content to preheat the condensed organic motive fluid prior to being vaporized, thereby increasing the power output of ORC 10. Pressure $P_5$ of the NCGs fed to mixing unit 32 is relatively high, generally higher than well head pressure $P_1$, to ensure that the NCGs be sufficiently dissolved in the steam condensate prior to being delivered to preheater 9. The heat depleted reconstructed fluid exits preheater 9 via a conduit 47 leading to reinjection well 49.

The reconstructed fluid exiting preheater 9 may be introduced into another heat exchanger, for additional heat transfer to the motive fluid.

Mixing unit 32 comprises a mixing chamber having an inlet for each of the three fluids to be mixed together, i.e. brine, steam condensate and NCGs, and can contain a motorized impeller disposed within the mixing chamber for generating a continuous stream of the reconstructed geothermal fluid discharged from the single mixing chamber outlet at preferably a high velocity. The mixing operation establishes the equilibrium conditions, allowing the NCG and brine solutes to be dissolved in the steam condensate solvent without any significant change in dissolution during flow through preheater 9 and conduit 47 despite a reduction in the heat capacity of the reconstructed geothermal fluid.

Alternatively, mixing unit 32 is motorless and the mixing chamber is suitably configured to induce good mixing of the solutes with the solvent. For example, the inlet for each of the brine and steam condensate streams into the mixing chamber may be disposed at different angles or provided with different configurations, so as to induce vortices within the mixing chamber. The inlet of the NCGs into the mixing chamber may be from above, so that when the NCGs are pressurized to a sufficiently high level, good dispersion of the NCGs within the solvent may be realized.

Controller 38 is in data communication with a plurality of controllable flow components, for example but not limited to brine pump 25, condensate pump 41, compressor 46, and a control component 48, such as a control valve or pump, for controlling the conditions of the single vapor or gas phase fluid flowing from SC 20 to CV 13. Although control component 48 is schematically illustrated as being housed within SC 20, it will be appreciated that control component 48 may be disposed externally to SC 20.

Accordingly, controller 38 is adapted to control the operation of the controllable components in such a way so as to bring about virtually the reconstruction of the geothermic fluid and achieve solubility equilibrium conditions.

The primary consideration in reconstructing the geothermal fluid is in producing suitable solubility conditions. The simultaneous operation of brine pump 25, condensate pump 41, and compressor 46 controls the flow rate of brine through conduit 24, the flow rate of steam condensate through conduit 39, and the flow rate of NCGs through conduit 43, respectively, and consequently the relative concentration of each component of the reconstructed fluid. Since solubility is greatly dependent on temperature, controller 38 may control operation of these controllable components in order to achieve a concentration for each of the solutes at the given temperature of the solute which assures that the inorganic salt constituents of the brine will not precipitate out from the reconstructed geothermal fluid.

The brine temperature $T_2$ which is higher than the temperature $T_4$ of the steam condensate or the temperature $T_5$ of the separated NCGs generally determines the temperature $T_6$ of the reconstructed fluid. The temperature of the reconstructed fluid can therefore be controlled by adjusting the flow rate generated by brine pump 25 insofar as the reconstructed fluid will achieve solubility equilibrium conditions.

However, the temperature $T_5$ of the NCGs can also be controlled to a certain extent by means of compressor 46, the temperature of the NCGs rising when increasingly compressed. Since the flow rate of the NCGs will also increase when increasingly compressed, the relative concentration of the solutes will change. To compensate for the change in relative concentration if the reconstructed brine will no longer have solubility equilibrium conditions, control component 48 may be commanded to cause an increase in flow rate of the extracted geothermal fluid through production well 11 or of the vapor or gas phase fluid exiting SC 20.

The geothermal fluid may also be reconstructed by taking into account its heat capacity so as to maximize the rate of heat transfer to the organic motive fluid by means of preheater 9. The reconstructed fluid can therefore be used during the preheating step to increase the sensible heat of the organic motive fluid to its boiling point, while the latent heat of vaporization of the motive fluid is supplied by the latent heat of condensation of the single vapor or gas phase fluid introduced to CV 13. As the heat is transferred from the reconstructed fluid at a rate that is dependent on its mass flow rate, more heat can be supplied by the reconstructed fluid during the preheating step when its mass flow rate is increased. The mass flow rate of the reconstructed fluid can be increased by suitably operating one or more of the controllable components insofar as the solubility equilibrium conditions are maintained.

By reconstructing the geothermal fluid, the high temperature $T_2$ of the brine which is substantially equal to the temperature $T_1$ of the extracted geothermal fluid can be exploited for preheating the motive fluid without concern that precipitation from the brine will foul the heat exchanger surfaces of the preheater. The temperature $T_5$ of the NCGs which is considerably higher than temperature $T_4$ of the condensed steam also contributes to a relatively high heat capacity of the reconstructed fluid.

The NCGs which are usually saturated with vapor normally adversely affect heat transfer due to the accumulation of a gas film or gas or stagnation pockets on a heat exchanger tube surface that causes additional thermal resistance and also reduces the temperature at which the steam condenses as a result of the reduced partial pressure of vapor in the film. Since the NCGs, however, are advantageously dissolved in the reconstructed fluid in a manner similar to the subterranean conditions of the geothermal fluid, a gas film or gas or stagnation pockets will not accumulate on the tube surfaces of preheater 9 and the heat transfer coefficient of the heat exchanger tubes will not be negatively influenced.

Controller 38 may also be operable to control the operation of the controllable components so as to reconstruct the geothermal fluid with a sufficiently high acidity to prevent precipitation of inorganic salts and scaling without necessarily achieving solubility equilibrium conditions. If desired, a small amount of chemical inhibitors may be used.

SP system 30 may also comprise bleed valves BV1 and BV2 for reducing the flow rate of the reconstructed fluid or for changing the relative concentration of its components, if necessary. Controller 38 is operable to command the operation of bleed valves BV1 and BV2. BV1 is in fluid communication with conduit 43, and when opened, will allow the NCGs to be bled to the ambient air or to be reinjected into reinjection well 49. When the NCGs contain carbon dioxide, as in many cases, the bled NCGs may be used in various industrial or commercial processes. BV2 is in fluid communication with steam condensate conduit 39.

In an exemplary ORC power plant preheated by reconstructed geothermal fluid according to the teachings of the present invention, the geothermal fluid temperature exiting the steam-brine separator is 143° C. and the pressure thereof is approximately 4 bar. The steam flow is 48 tons/hr, while the flow of the brine is 693 tons/hr and the flow of the NCGs is 2.06 tons/hr. The pH of the brine is 7.3 for geothermal fluid having a chloride concentration of about 44,140 mg/l, a sulphate concentration of about 25 mg/l, and a bicarbonate concentration of about 39 mg/l. The temperature of the reconstructed fluid at the inlet to the preheater is 127.5° C. while its pressure thereat is slightly greater than 4 bar. The temperature of the reconstructed fluid at the outlet of the preheater is 97° C. while its pressure thereat is slightly approximately 3 bar. The motive fluid temperature at the inlet to the preheater is 62° C., and its temperature in the vaporizer is 121° C.

Figure 2:
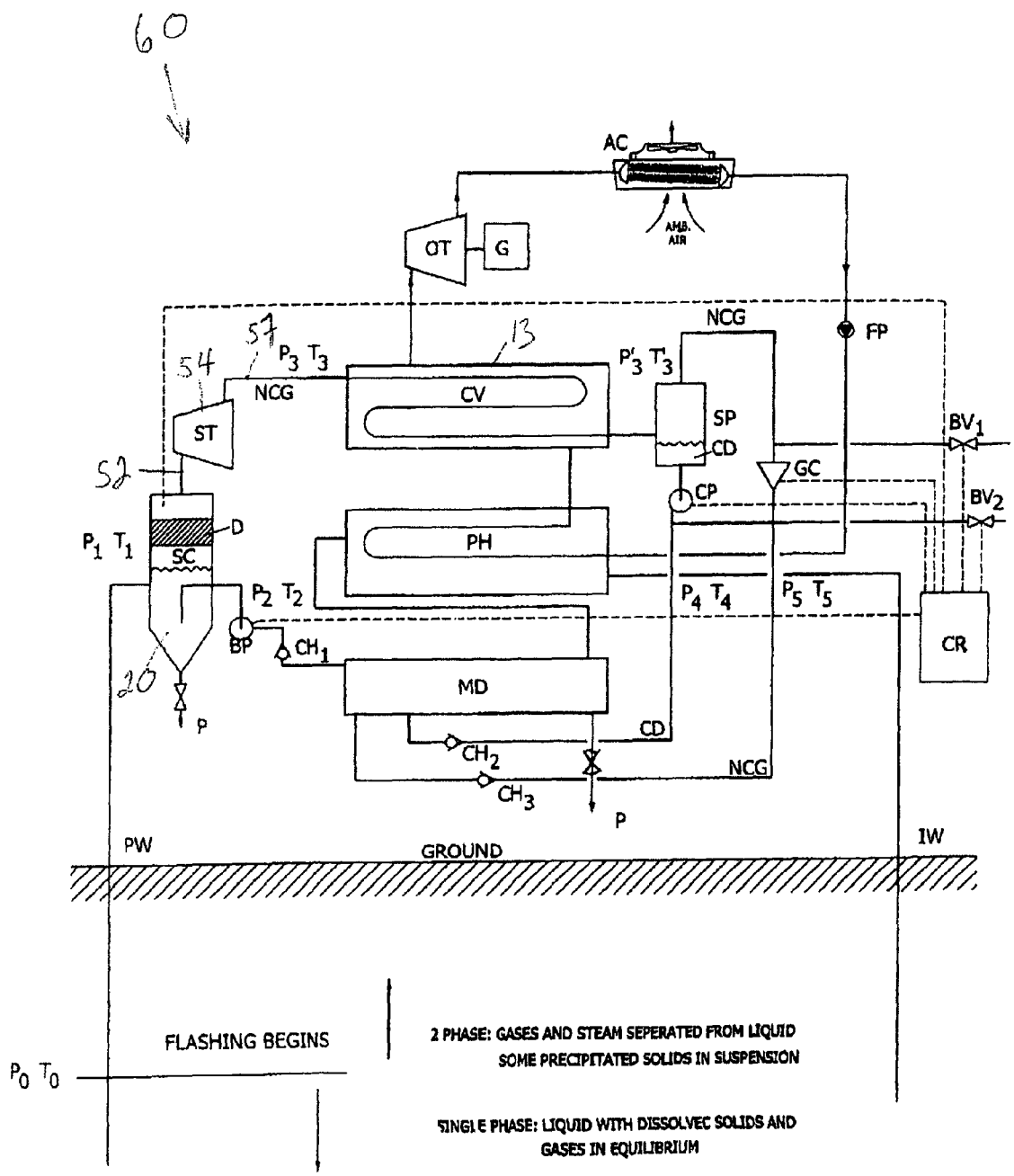

FIG. 2 illustrates a power plant 60 which is identical to power plant 40 of FIG. 1, with the exception that the single vapor or gas phase fluid exiting SC 20 is delivered to a steam turbine 54 via conduit 52, in order to produce an additional amount of power. The vapor discharge of steam turbine 54 is delivered to CV 13 via conduit 57 in order to vaporize the motive fluid.

In another embodiment of the invention, the geothermal fluid can be used for purposes of space heating while preventing scaling of the heat exchangers. For example, a heat utilization system can be connected to a power plant to the type described with reference to FIGS. 1 and 2 in which for example an organic motive fluid is used in a power plant operating according to the Rankine cycle. In such a manner, for example, a heat exchanger can be used for heating a confined area or a region or a heat exchanger for generating domestic or commercial steam. The reconstructed geothermal fluid is used to preheat the motive fluid, or alternatively, for providing makeup water.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for preventing scaling of geothermal fluid, comprising the steps of:
   determining equilibrium conditions of at least pressure and temperature of a geothermal fluid at a subterranean location;
   extracting the geothermal fluid from the subterranean location;
   separating brine, steam and non-condensable gas portions of the extracted geothermal fluid;
   heating a motive fluid of a heat utilization system using said separated steam to produce a steam condensate;
   mixing the separated brine, steam condensate and non-condensable gas portions;
   controlling at least the pressure and temperature of the brine, steam condensate and non-condensable gas portions being mixed to provide a reconstructed geothermal fluid at substantially said equilibrium conditions, whereby dissolved solids are not precipitated in the reconstructed geothermal fluid; and
   preheating the motive fluid of the heat utilization system using said reconstructed geothermal fluid.

2. The method according to claim 1, wherein said step of heating a motive fluid of a heat utilization system using said separated steam to produce a steam condensate further comprises a step of separating a non-condensable gas portion from the steam condensate, wherein the non-condensable gas portion mixed in the mixing step includes the non-condensable gas portion separated from the steam condensate.

* * * * *